United States Patent
Chehade et al.

(10) Patent No.: US 11,955,021 B2
(45) Date of Patent: Apr. 9, 2024

(54) SYSTEM AND METHOD FOR CLASSIFYING VEHICLE BEHAVIOUR

(71) Applicant: BAE SYSTEMS plc, London (GB)

(72) Inventors: Benjamin Thomas Chehade, London (GB); Markus Deittert, Bristol (GB); Matthew Neil Joseph, Dorchester (GB); Simon Jonathan Mettrick, New Malden (GB); Yohahn Aleixo Hubert Ribeiro, New Malden (GB); Frederic Francis Taylor, Portsmouth (GB)

(73) Assignee: BAE SYSTEMS PLC, London (GB)

( * ) Notice: Subject to any disclaimer, the term of this patent is extended or adjusted under 35 U.S.C. 154(b) by 370 days.

(21) Appl. No.: 17/432,257

(22) PCT Filed: Mar. 13, 2020

(86) PCT No.: PCT/GB2020/050640
§ 371 (c)(1),
(2) Date: Aug. 19, 2021

(87) PCT Pub. No.: WO2020/201693
PCT Pub. Date: Oct. 8, 2020

(65) Prior Publication Data
US 2022/0254261 A1    Aug. 11, 2022

(30) Foreign Application Priority Data

Mar. 29, 2019 (EP) ..................... 19275035
Mar. 29, 2019 (GB) ..................... 1904380

(51) Int. Cl.
*G08G 5/00* (2006.01)
*G01S 13/88* (2006.01)

(52) U.S. Cl.
CPC .......... *G08G 5/0082* (2013.01); *G01S 13/88* (2013.01); *G08G 5/0013* (2013.01)

(58) Field of Classification Search
CPC .. G08G 5/0082; G08G 5/0013; G08G 5/0026; G08G 5/0056; G01S 13/88; G01S 13/782; G01S 13/91; G01S 7/412
See application file for complete search history.

(56) References Cited

U.S. PATENT DOCUMENTS

| | | | |
|---|---|---|---|
| 4,623,083 A | 11/1986 | Pagano | |
| 5,548,515 A | 8/1996 | Pilley et al. | |

(Continued)

FOREIGN PATENT DOCUMENTS

| | | |
|---|---|---|
| GB | 2553654 A | 3/2018 |
| JP | 2008130047 A | 6/2008 |

(Continued)

OTHER PUBLICATIONS

International Search Report and Written Opinion received for PCT Application No. PCT/GB2020/050640, dated Jun. 23, 2020. 28 pages.

(Continued)

*Primary Examiner* — Mussa A Shaawat
(74) *Attorney, Agent, or Firm* — Finch & Maloney PLLC (57) ABSTRACT

The present invention relates generally to a method and system (10) for classifying vehicle behaviour, particularly abnormal behaviour of civil aircraft (12). The method may comprise receiving aircraft data from an aircraft (12) which is to be classified; and determining whether the received aircraft data comprises identification information for the aircraft (12). In response to a determination that the received aircraft data comprises identification information, the method may comprise using said identification information to classify the behaviour of the aircraft (12). In response to a determination that the received aircraft data does not comprises identification information, the method may comprise obtaining the position of the aircraft and comparing the (Continued)

obtained position to an expected route for the aircraft to classify the behaviour of the aircraft (12).

18 Claims, 6 Drawing Sheets

(56) References Cited

U.S. PATENT DOCUMENTS

| | | | |
|---|---|---|---|
| 5,712,785 A | 1/1998 | Mok et al. | |
| 6,081,764 A | 6/2000 | Varon | |
| 7,299,130 B2* | 11/2007 | Mulligan | G05D 1/0094 701/13 |
| 7,606,115 B1* | 10/2009 | Cline | G08G 5/045 367/136 |
| 8,521,340 B2* | 8/2013 | Coulmeau | G08G 5/0039 701/16 |
| 9,087,451 B1* | 7/2015 | Jarrell | G08G 5/003 |
| 9,221,557 B1* | 12/2015 | Friesel | B64F 1/025 |
| 9,296,092 B2 | 3/2016 | Jin et al. | |
| 9,412,278 B1* | 8/2016 | Gong | G08G 5/0078 |
| 2007/0024494 A1 | 2/2007 | Dizaji et al. | |
| 2007/0200761 A1 | 8/2007 | Smith | |
| 2010/0084513 A1* | 4/2010 | Gariepy | G05D 1/0094 244/190 |
| 2011/0144897 A1 | 6/2011 | Dunsky | |
| 2011/0184895 A1 | 7/2011 | Janssen | |
| 2012/0022719 A1* | 1/2012 | Matos | G08G 5/0008 701/2 |
| 2013/0304369 A1* | 11/2013 | Mathews | G09B 23/10 701/400 |
| 2014/0012493 A1* | 1/2014 | Mathews | G09B 23/10 701/400 |
| 2014/0058657 A1* | 2/2014 | Mathews | G05D 1/0212 701/400 |
| 2014/0097979 A1 | 4/2014 | Nohara | |
| 2014/0114885 A1 | 4/2014 | Han et al. | |
| 2014/0214469 A1* | 7/2014 | Callow | G06Q 10/063114 705/7.15 |
| 2015/0325064 A1* | 11/2015 | Downey | G08G 5/0039 701/29.3 |
| 2015/0336668 A1* | 11/2015 | Pasko | B64C 39/024 701/2 |
| 2016/0023760 A1* | 1/2016 | Goodrich | B64C 39/024 244/76 R |
| 2016/0068268 A1* | 3/2016 | Bookless | B64C 39/024 701/3 |
| 2016/0153791 A1* | 6/2016 | Deittert | G06Q 10/047 701/25 |
| 2018/0068567 A1* | 3/2018 | Gong | G08G 5/0039 |
| 2018/0345496 A1 | 12/2018 | Li et al. | |
| 2019/0314942 A1 | 10/2019 | Lin et al. | |
| 2020/0191943 A1* | 6/2020 | Wu | G01S 13/726 |
| 2020/0264268 A1* | 8/2020 | Moore | G06V 20/52 |
| 2022/0253720 A1 | 8/2022 | Chehade et al. | |

FOREIGN PATENT DOCUMENTS

| | | |
|---|---|---|
| KR | 20130081907 A | 7/2013 |
| KR | 101454102 B1 | 10/2014 |
| WO | 2011/057323 A1 | 5/2011 |
| WO | 2018/176000 A1 | 9/2018 |
| WO | 2018/206504 A1 | 11/2018 |
| WO | 2020/169963 A1 | 8/2020 |
| WO | 2020/201693 A1 | 10/2020 |

OTHER PUBLICATIONS

Search Report under Section 17(5) received for GB Application No. 1904380.1, dated Sep. 24, 2019. 3 pages.

Extended European Search Report received for EP Application No. 19275035.4 dated Oct. 22, 2019. 8 pages.

International Search Report and Written Opinion received for PCT/GB2020/050389, dated May 15, 2020. 14 pages.

GB Search Report Under Section 17(5) received for GB Application No. 1902457.9, dated Aug. 5, 2019. 5 pages.

Brax, Christopher and Niklasson, Lars, "Enhanced situational awareness in the maritime domain: an agent-based approach for situation management," Proc. SPIE 7352, Intelligent Sensing, Situation Management, Impact Assessment, and Cyber-Sensing, 735203, May 19, 2009. 12 pages.

Brax, et al., "Finding behavioural anomalies in public areas using video surveillance data," Information Fusion, 2008 11th International Conference On, IEEE, Jun. 30, 2008. 8 pages.

LeFort, Eric, "My Thoughts on Synthetic Data," (Jun. 27, 2018) 10 pages.

Silver, et al., "Deterministic Policy Gradient Algorithms," Proceedings of Machine Learning Research, vol. 32, Jun. 21, 2014. 10 pages.

International Preliminary Report on Patentability received for PCT/GB2020/050640, dated Oct. 14, 2021. 9 pages.

International Preliminary Report on Patentability received for PCT/GB2020/050389, dated Sep. 2, 2021. 8 pages.

Shen et al., Automatic Collision Avoidance of Ships in Congested Area Based on Deep Reinforcement Learning, Mar. 24, 2017, The Japan Society of Naval Architects and Ocean Engineers, pp. 651-656 (2017).

Cheng et al., Concise deep reinforcement learning obstacle avoidance for underactuated unmanned marine vessels, Department of Automation, Shanghai Jiaotong University, available online Jul. 1, 2017, Elsevier B.V. 2017, pp. 63-73 (2017).

* cited by examiner

SYSTEM AND METHOD FOR CLASSIFYING VEHICLE BEHAVIOUR

The present invention relates generally to a system for classifying vehicle behaviour, particularly abnormal behaviour of civil aircraft.

BACKGROUND

Aircraft typically include a transponder which emits signals carrying identifying information about the aircraft. Two common signals that are used to identify aircraft are an automatic dependent surveillance broadcast (ADS-B) and a response to an identification friend or foe (IFF) interrogation. A problem with these signals is that they can be "spoofed" by other vehicles and/or aircraft so that the other vehicles can conceal their true identity from surveillance systems. For example, a military aircraft can spoof the signal to appear incorrectly on radars as a civilian aircraft.

It is an example aim of example embodiments of the present invention to at least partially overcome or avoid one or more problems of the prior art, whether identified herein or elsewhere, or to at least provide an alternative to existing systems and related methodologies.

SUMMARY OF INVENTION

According to a first aspect of the present invention, there is provided a method for classifying aircraft behaviour, the method comprising: receiving aircraft data from an aircraft which is to be classified; determining whether the received aircraft data comprises identification information for the aircraft; in response to a determination that the received aircraft data comprises identification information, using said identification information to classify the behaviour of the aircraft; and in response to a determination that the received aircraft data does not comprises identification information, obtaining the position of the aircraft and comparing the obtained position to an expected route for the aircraft to classify the behaviour of the aircraft.

The different kinds of aircraft data may include some or all of radar data, ship data, radar performance data and identification data, e.g. IFF data. Some or all of the indicated data may not be available. The identification data may include the mode S address and/or the flight ID, and may also include a time as well as positional information for the aircraft, e.g. slant range and bearing.

The method may further comprise obtaining the position of the aircraft which is to be classified; comparing the position of the aircraft to known routes to determine whether the aircraft is within any known route; and in response to determining that the aircraft is not on any known route, classifying the behaviour as suspicious. In this way, spoofing aircraft may be detected.

The method may comprise obtaining the position of the aircraft from the received data or from radar data. The position may include positional information such as latitude, longitude and height.

The method may further comprise receiving identification information from a plurality of aircraft at the same time as receiving the aircraft data from the aircraft to be classified. Using said identification information to classify the behaviour of the aircraft may then comprise determining whether at least part of the identification information received from one of the plurality of aircraft. In response to determining that at least part of the identification information is a duplicate, the method may comprise classifying the behaviour as suspicious. In this way, spoofing aircraft may be detected.

The method may further comprise storing historical data for a plurality of aircraft. Using said identification information to classify the behaviour of the aircraft may then comprise determining whether at least part of the identification information matches identification information in the historical data. In response to determining that at least part of the identification information matches identification information in the historical data, the method may further comprise obtaining a route associated with the matching identification information in the historical data; obtaining the position of the aircraft; comparing the obtained position to the associated route to determine whether the aircraft is travelling along the associated route; and classifying the behaviour as suspicious when it is determined that the aircraft is not travelling along the associated route. Furthermore, when it is determined that the aircraft is travelling along the associated route, the method may comprise determining an expected position along the associated route; comparing the obtained position to the expected position along the associated route; and classifying the behaviour as suspicious when it is determined that the aircraft is not at the expected position. In these ways, spoofing aircraft may be detected.

The method may further comprise selecting the expected route by comparing the position data for the aircraft to be classified with a plurality of routes which have been generated by a model which has been trained using historical data received from a plurality of aircraft.

The method may further comprise issuing an IFF request and receiving the received data in response to the IFF request.

The identification information may comprise at least one of an aircraft identification which uniquely identifies the aircraft and a flight identification which identifies a flight path along which the aircraft is travelling. The method may then further comprise determining that the identification information comprises both the aircraft identification and the flight identification. Using said identification information to classify the behaviour of the aircraft may then comprise comparing the aircraft identification and the flight identification to historical data to determining whether they are a matching pair, and classifying the behaviour as suspicious when it is determined that the aircraft identification and the flight identification are not a matching pair. This is another way that spoofing aircraft may be detected.

The identification information may comprise an identification of the type of aircraft. Using said identification information to classify the behaviour of the aircraft may then comprise receiving radar data about the aircraft, determining a cross-section value for the aircraft from the radar data, comparing the determined cross-section value with an expected cross-section value for the type of aircraft, and classifying the behaviour as suspicious when it is determined that the determined cross-section value and the expected cross-section value do not match. This is another way that spoofing aircraft may be detected.

The method may comprise determining the cross-section value from the signal to noise ratio and observed radar cross-section for the radar data. The method may further comprise calculating the expected cross-section value using a stored value for the type of aircraft and adjusting based on at least a distance to the aircraft and an orientation of the aircraft.

According to another aspect of the invention, there is also provided a system for classifying aircraft behaviour, the system comprising: at least one sensor for receiving aircraft data from an aircraft which is to be classified; and a processor which is configured to: determine whether the received aircraft data comprises identification information for the aircraft; in response to a determination that the received aircraft data comprises identification information, use said identification information to classify the behaviour of the aircraft; and in response to a determination that the received aircraft data does not comprises identification information, obtain the position of the aircraft and comparing the obtained position to an expected route for the aircraft to classify the behaviour of the aircraft.

The processor may be further configured to carry out the method steps described above.

According to another aspect of the invention, there is a non-transitory computer-readable medium comprising processor control code which when running on a system causes the system to carry out the method described above.

It will be appreciated that any one or more features described in relation to an aspect of the invention may replace, or be used in combination with, any one or more features described in relation to another aspect of the invention, unless such replacement or combination would be understood by the skilled person as mutually exclusive, after a reading of this disclosure. In particular, any features described in relation to apparatus-like aspects may be used in combination with, or in place of, any features described in relation to method-like aspects. For example, each of the ways of determining or detecting a spoofing aircraft which are described above may be used alone or in conjunction with one another. They may also be carried out in any appropriate order.

FIGURES

For a better understanding of the invention, and to show how embodiments of the same may be carried into effect, reference will now be made, by way of example, to the accompanying diagrammatic figures in which:

FIG. 1b is an illustration of a plurality of flight paths which may be derived by the classifying system of FIG. 1a;

FIGS. 2a to 2d depict a flowchart setting out example steps carried out by the classifying system of FIG. 1a; and FIG. 3 is a schematic block diagram of components of the classifying system of FIG. 1a.

Figure 1A:
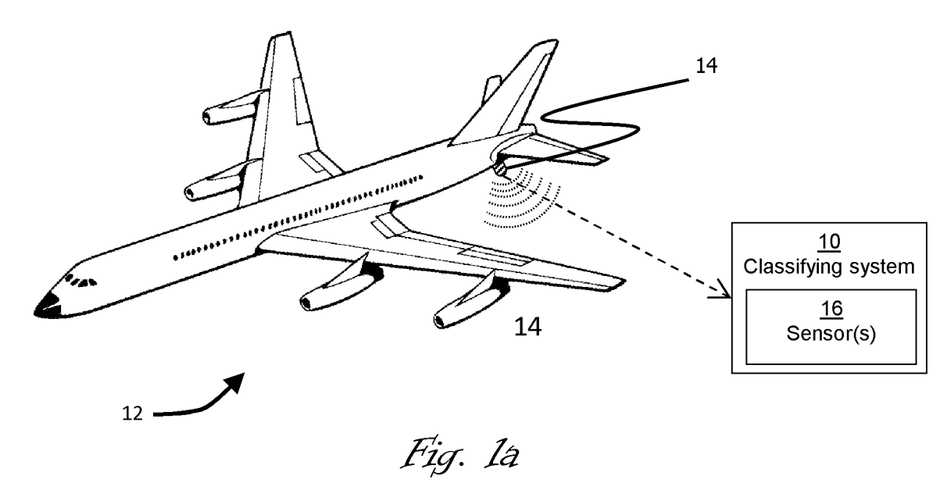
FIG. 1a is a schematic illustration of the classifying system.

FIG. 1a shows a schematic illustration of the classifying system 10. A vehicle which in this example is an aircraft 12 is periodically sending a signal from a transponder 14 mounted to the underside of the aircraft 12. A common format for such a periodic signal is an automatic dependent surveillance broadcast (ADS-B) signal, although it will be appreciated that other formats can be used. Such a signal may be detected by the classifying system 10, for example by one or more sensors 16 within the system. The transponder 14 may also send a signal in response to a query from the classifying system 10 and the response may be detected by the same or a different sensor 16. Such a response signal may be a response to an identification friend or foe (IFF) interrogation.

The format of these two signals (e.g. the periodic and call-response signals) may be different which means that it may be difficult to compare the signals. For example, an ADS-B signal may comprise the Mode S address, the flight ID, the position (e.g. latitude and longitude) and time (e.g. day and hour). The IFF response signal typically comprises the Mode S address and time. The IFF response may further comprise the flight ID depending on the IFF interrogation. The position associated with the aircraft sending the IFF response can be derived from the position data in the IFF response together with the position data from the classifying system itself.

The mode S address (or ICAO—International Civil Aviation organisation—address) is a unique identification for the aircraft unless the aircraft is sold to another country. The flight ID (e.g. EZY1234) is an identifier which is set by the crew upon commencing a flight. The flight ID is typically associated with a particular route and thus as explained below, the classifying system can learn the departure and arrival locations associated with the flight ID.

Figure 1B:
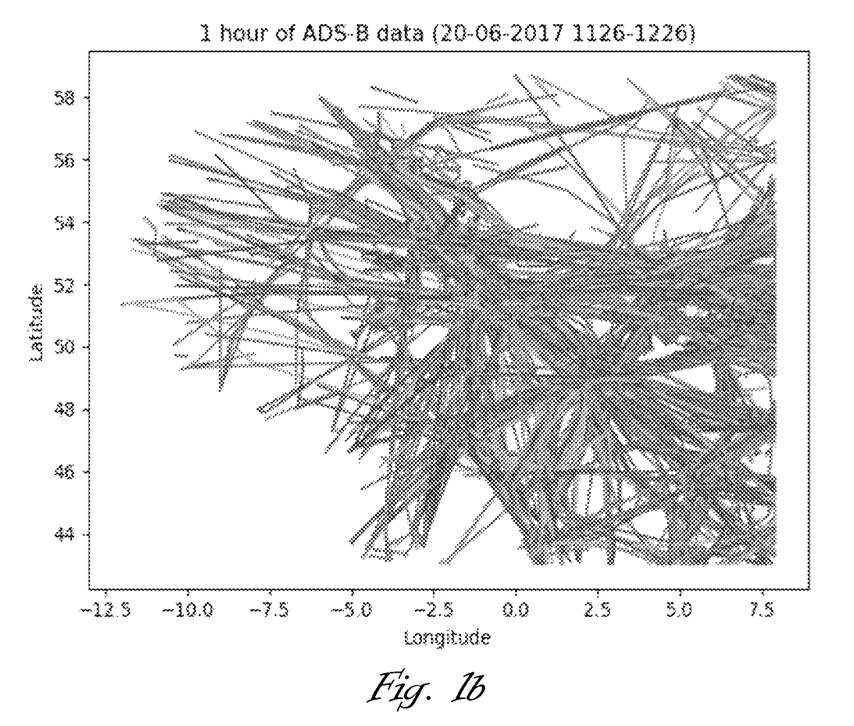

FIG. 1b is an illustration of a plot of aircraft tracks in a European airspace. Each track represents a different aircraft. The tracks were plotted based on the ADS-B data which was received in an hour window from multiple aircraft. As shown, the flight paths typically cluster around airports. Furthermore, there is a significant amount of data and thus it is typically difficult to identify an aircraft which is in an unexpected location or which is attempting to spoof another aircraft.

FIGS. 2a to 2d illustrate an example method of detecting inconsistent aircraft behaviour, for example to identify spoofing of aircraft.

Figure 2A:
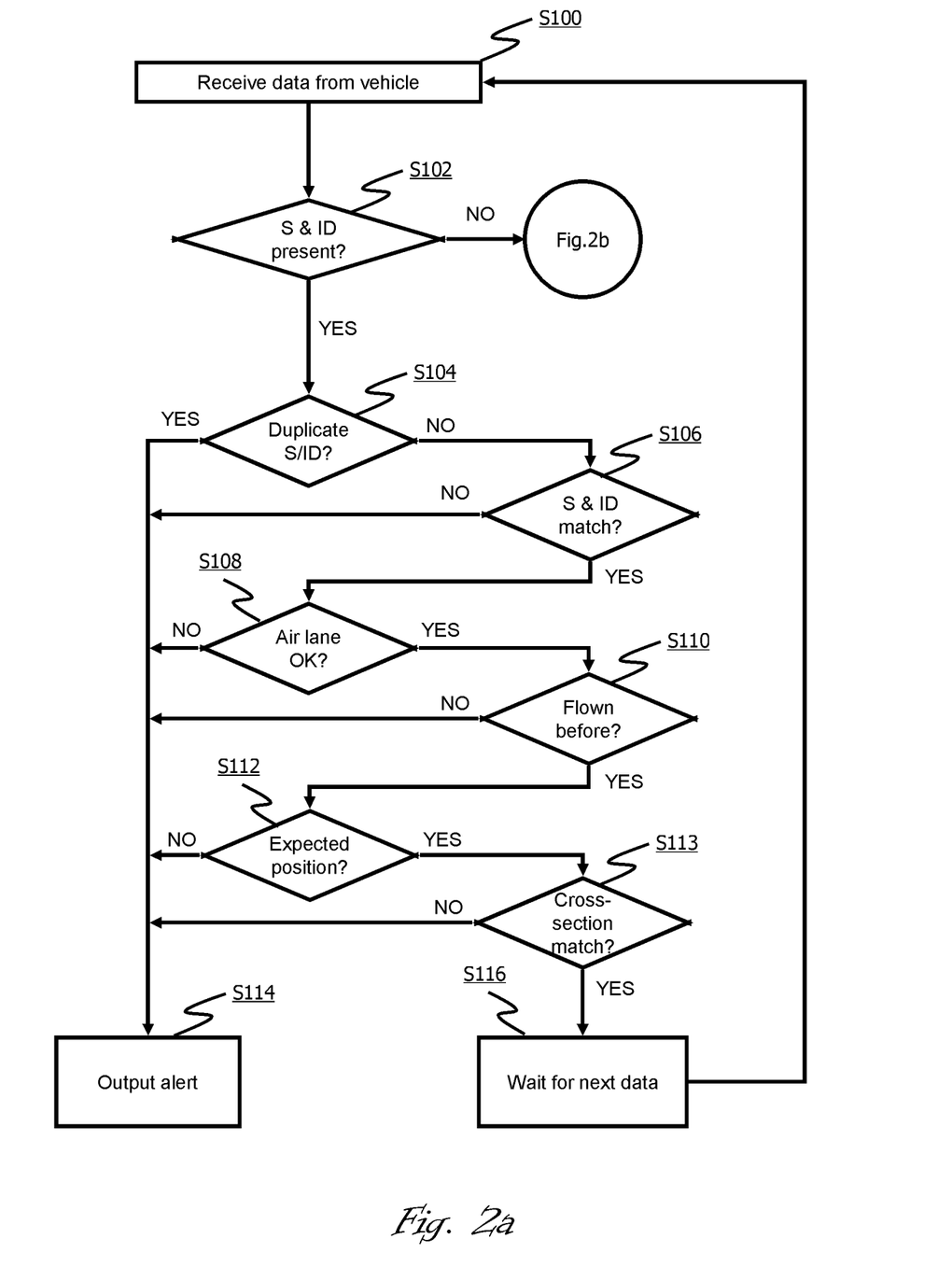

In a first step, data is received from a vehicle by the classifying system (step S100) and this effectively identifies a new track to be analysed by the system. The received data may for example be an IFF response, or an ADS-B signal. The classifying system 10 then checks the data which has been received to determine whether to follow the classification paths shown in FIG. 2a, 2b, 2c or 2d. For example, as shown in step S102, there is a check to see whether both the mode S address and the flight ID have been received. If one or both of these pieces of information are missing, the method proceeds to the next step (S202) shown in FIG. 2b. However, if both of these pieces of information are present, the data can then be analysed, and the method proceeds as shown in FIG. 2a. However, it will be appreciated that the following steps of the analysis can be carried out in any order not just the one described herein. Furthermore, some of the steps could be carried out simultaneously or some steps could be omitted.

In one example, the next step in the analysis is to determine whether or not one or both of the received mode S address and the flight ID have already been received at the classifying system (S104). In other words, a duplicity check is carried out to compare the received data to all current data, for example received ADS-B data, to determine whether or not there is a match. If one or both of the pieces of data is duplicated, it is possible that one aircraft is spoofing the other matching aircraft. Accordingly, the next step is to issue an alert to a user (step S114). The alert can be in any audio/visual format and may simply recommend that a user interaction is required to further analyse the received data.

The next example step which may be included in the analysis is to check whether the received mode S address and flight ID match each other. In other words, a data pairing check is carried out to see whether they would be expected to form a pair (step S106). This matching step could be done by comparison to a database of stored pairings or based on a comparison with historical data to derive a pattern of pairings. If the pieces of data do not form a pair, the next step is to issue an alert to a user (step S114) as described above.

The classifying system may also have received or derived position data for the aircraft. Accordingly, another example check that could be included is an air lane check to determine whether the aircraft is within a recognised air lane (step S108). The recognised air lanes may be published by aviation authorities or can be learnt by analysing the routes taken by aircraft previously from data recordings. If the aircraft is not within any recognised air lane, or is flying too high or low, the classifying system 10 issues an alert to a user (step S114) as described above.

The position data may also be used to perform a current position check to check the current position of the aircraft against historical data which has been stored for the aircraft (step S110). The mode S address may be used to identify the historical data. For example, the air lane in which the aircraft is flying may be identified. There may then be a check to see whether the aircraft has flown in the identified air lane before, and if not the next step is to issue an alert to a user (step S114) as described above.

The position data may be used along side received time data for a check on the expected position of the aircraft as shown in step S112. In this check, the time and day of the current position of the aircraft is compared to the historic data to determine whether this flight is likely to be another instance of a regularly scheduled route that the aircraft has flown previously. Accordingly, the combination of time and position data can be used to determine if the aircraft is exceptionally early or late to reach this location. Alternatively, the historical data can be used to determine where the aircraft was last seen and whether it is feasible for the aircraft to travel to the current location without any intervening reports. If not, the next step is to issue an alert to a user (step S114) as described above.

In another example step, radar data may be used for a cross-section check (step S113). A cross-section value for the aircraft may be derived from the radar data, which may be data which is included in the radar data or alternatively, the cross-section value may be inferred from the signal to noise ratio in the radar data. The cross-section value may be a classification that the aircraft has a large, medium or small cross-section or may be a numerical value. The cross-section value determined from the radar data may be compared to a cross-section value within a target database. To make this comparison, it is necessary to know the reported type of aircraft. This aircraft type may be determined using the identification information, e.g. the ADB-S data which was received from the aircraft (at step S102). An adjustment, e.g. for position, orientation and other factors, to the stored cross-section value may be made to calculate an expected cross-section value based on several parameters. Once the expected value of the cross-section has been calculated, this is compared with the cross-section value derived from the radar data. A confidence value which is indicative of the likelihood that the two values are matched may then be determined. The confidence value may be compared to a threshold value which may be (pre)determined by training a machine learning algorithm module using historical data and determining which confidence value is sufficient to give an accurate identification. In general it is noted that some types of aircraft (e.g. military) have significantly smaller cross-sections than other types of aircraft (e.g. commercial aircraft). Accordingly, the matching step does not need to be fine grained and detailed. If there is no match (i.e. the radar cross-section of the aircraft is significantly smaller/larger than the expected value) an alert can be issued as shown in step S114.

If none of the checks described in the example steps above (S104; S106; S108; S110; S112; S113) results in an alert (S114), the track which has been analysed can be classified as "neutral", and the method proceeds to wait for the next data to be received (S116), before returning to step S100 for analysis of the next signal. A neutral classification is indicative that the aircraft has been recognised and is not exhibiting any unusual behaviour. Such a classification may be displayed to a user for example by changing a colour of the track as displayed to the user on a user interface. Other classifications may include pending (e.g. where the track has not yet been classified), or unknown (e.g. where the track cannot be identified—for example within a given time limit, or owing to a breakdown in the process). Tracks which are pending or unknown may be flagged to a user, e.g. with the alert above. The system may also include a user interface to allow a user to change the classification and thus override the decision of the system. The method will be then loop back to the beginning (S100—FIG. 2a). It will be appreciated that not all of the checks/steps listed above need to be carried out. Moreover, the checks could be carried out in a different order to that listed above.

Figure 2B:
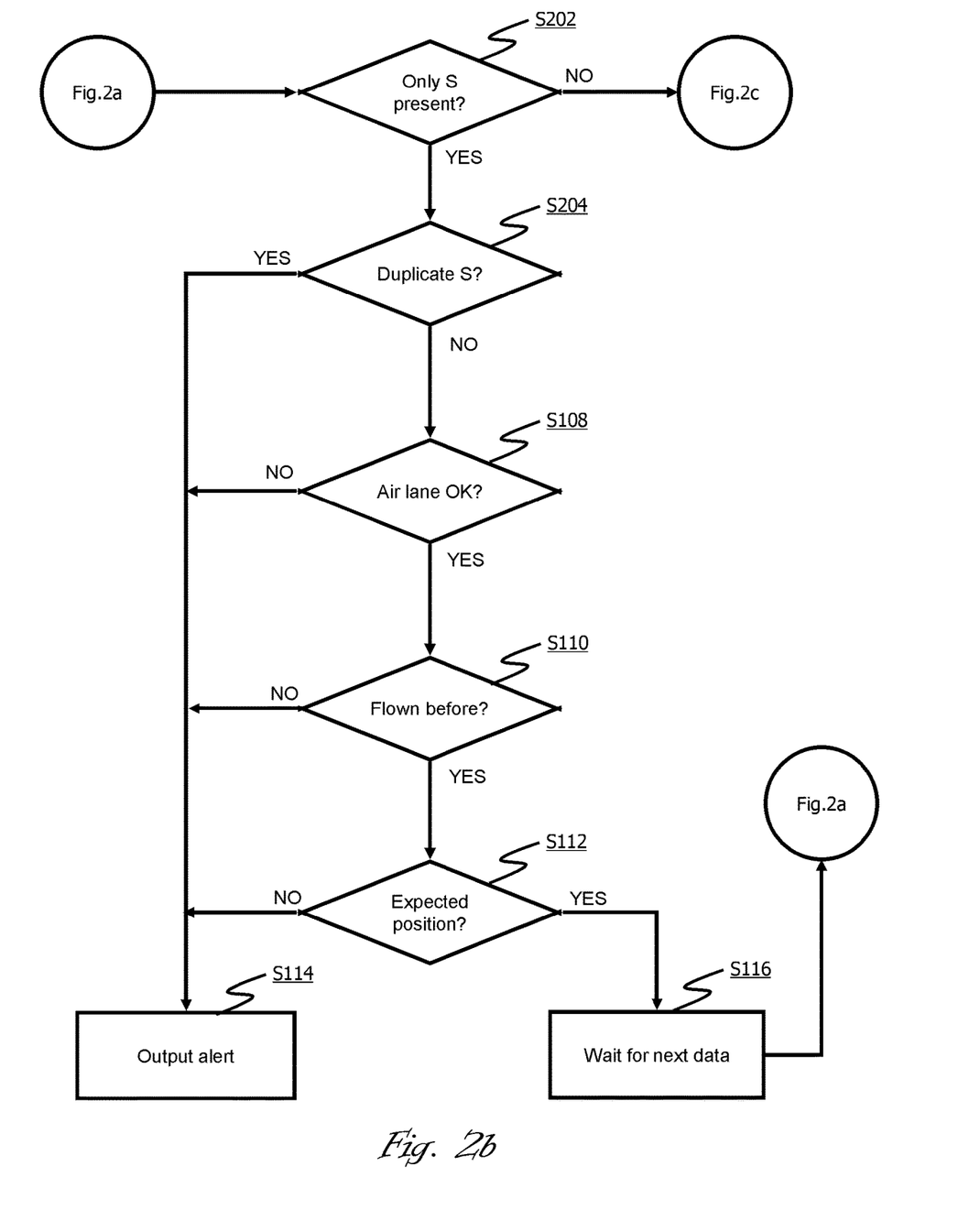

If the method determines at step S102 that at least one of the mode S address and/or the flight ID data is missing, then the method may proceed to FIG. 2b. At step S102, the alternative classification path determines whether only the mode S address is present. If the mode S address is not present on its own at step S202, the method may progress to the process shown in FIG. 2c. However, if only the mode S address is present at step S202, the data may then be analysed as follows. Again, the order of the steps can be changed, steps can be taken at the same time or steps can be omitted.

In a first example step (S204) in the analysis, it is determined whether the received mode S address has already been received by the classifying system. In other words, a duplicity check is carried out to compare the received data to all current data to determine whether or not there is a match. This step is similar to step S104 in FIG. 2a. If the mode S address is duplicated by another aircraft, the next step is to issue an alert to a user (step S114). The step of issuing an alert is the same as described above in relation to FIG. 2a and thus the same reference number is used.

As described in relation to FIG. 2a, the position data for the aircraft can be used to determine whether the aircraft is within a recognised air lane (step S108) and/or to check the current position of the aircraft against historical data which has been stored for the aircraft (step S110) and/or to determine whether this flight is likely to be another instance of a regularly scheduled route that the aircraft has flown previously (step S112). Similarly, although it is not depicted, step S113 relating to the radar cross-sectional check can also be carried out if there is sufficient information to identify the type of aircraft. These steps are the same as described above in relation to FIG. 2a and thus the same reference numbers are used. If none of the checks described above prompts an alert, the track which has been analysed can be classified as neutral and the method can simply wait until the next data is received (step S116) before returning to the first step (S100) shown in FIG. 2a.

Figure 2C:
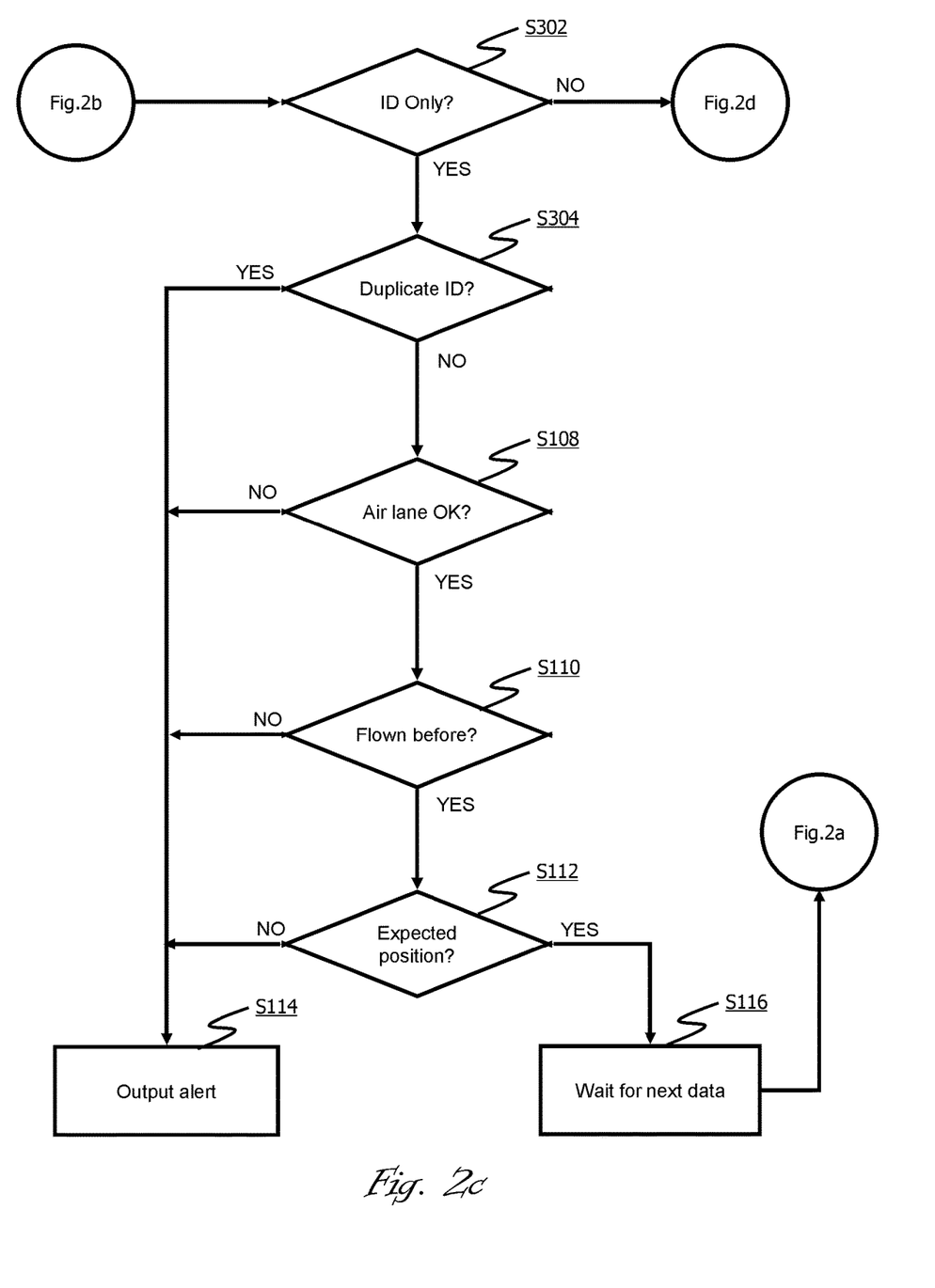

FIG. 2c shows an alternative classification path when only the flight ID is present, as determined in step S302. If the flight ID is not present, the method may progress to the steps shown in FIG. 2d. However, if the flight ID is present, the data can then be analysed as follows. Again, the order of the steps can be changed, steps can be taken at the same time or steps can be omitted.

In an example first step in the analysis, it is determined whether the flight ID has already been received at the classifying system (step S304). In other words, a duplicity check is carried out to compare the received data to all current data to determine whether or not there is a match. This step is similar to steps S104 in FIG. 2a and S204 in FIG. 2b. If the flight ID is duplicated by another aircraft (within a prescribed time period, or at the same time), the next step is to issue an alert to a user (step S114). The step of issuing an alert is the same as described above in relation to FIG. 2a and thus the same reference number is used.

As described in relation to FIGS. 2a and 2b, the position data for the aircraft can be used to determine whether the aircraft is within a recognised air lane (step S108) and/or to check the current position of the aircraft against historical data which has been stored for the aircraft (step S110) and/or to determine whether this flight is likely to be another instance of a regularly scheduled route that the aircraft has flown previously (step S112). Similarly, although it is not depicted, step S113 relating to the radar cross-section check can also be carried out if there is sufficient information to identify the type of aircraft. These steps are the same as described above in relation to FIG. 2a and thus the same reference numbers are used. If none of the checks described above prompts an alert, the track which has been analysed can be classified as neutral and the method can simply wait until the next data is received (step S116). The method will be then loop back to the first step (S100) shown in FIG. 2a.

Figure 2D:
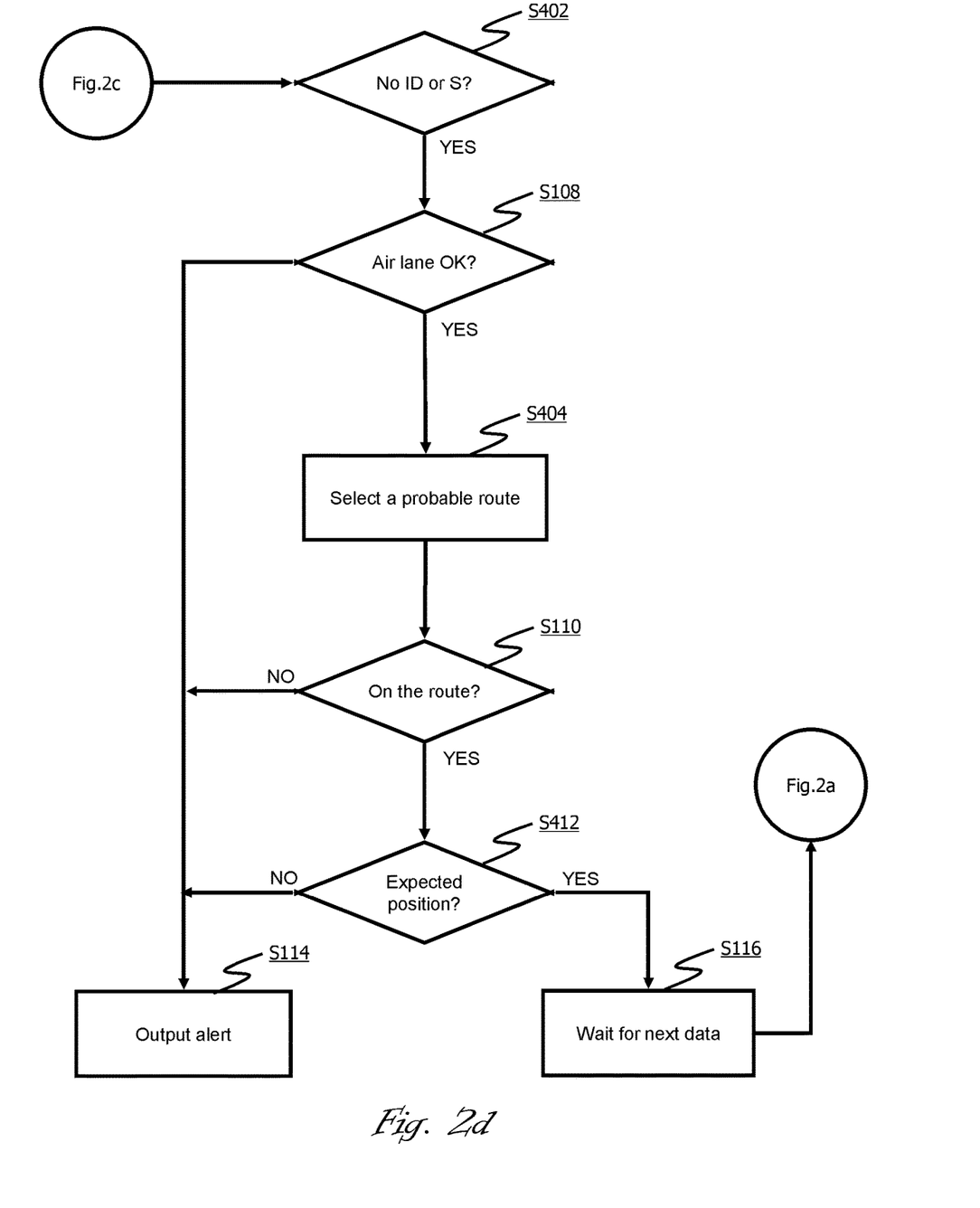

FIG. 2d shows an alternative classification path when neither the flight ID nor the mode S address is present in the received signal, as determined in step S402. It will be appreciated that each of steps S102, S202, S302 and S402 can be carried out simultaneously to select the correct classification path. If neither of the flight ID nor mode S address are present, none of the comparison to historical data which is described above can take place. However, the position data can be analysed as follows. Again, the order of the steps can be changed, steps can be taken at the same time or steps can be omitted.

As described in relation to FIGS. 2a to 2c, the position data for the aircraft can be used to determine whether the aircraft is within a recognised air lane (step S108) and if not an alert can be output (step S114). These steps are the same as described above in relation to FIG. 2a and thus the same reference numbers are used.

Unlike the classification paths of FIGS. 2a to 2c, there is no mode S address or flight ID to identify the historical information for the aircraft. Accordingly, the next step is to select the most probable route(s) (step S404) which the aircraft may be following based on the time and day and position information for the aircraft. The selection may be based on a learnt model which has been trained on historic data from aircraft flight patterns. The model may include expected tracks together with common deviations therefrom such as deviations from a great circle path or spread in cruising altitude. At step S410, there is a check to see if the aircraft is on the probable route. There is also a check shown at step S412 in which the current position and time of the aircraft against historical data for the probable route to determine whether the aircraft is where it would be expected if following this route.

If none of the checks described above prompts an alert (S114), the track which has been analysed can be classified as neutral and the method can simply wait until the next data is received (step S116). The method will be then loop back to the first step (S100) shown in FIG. 2a. Otherwise, an alert is output as described above (step S114).

Figure 3:
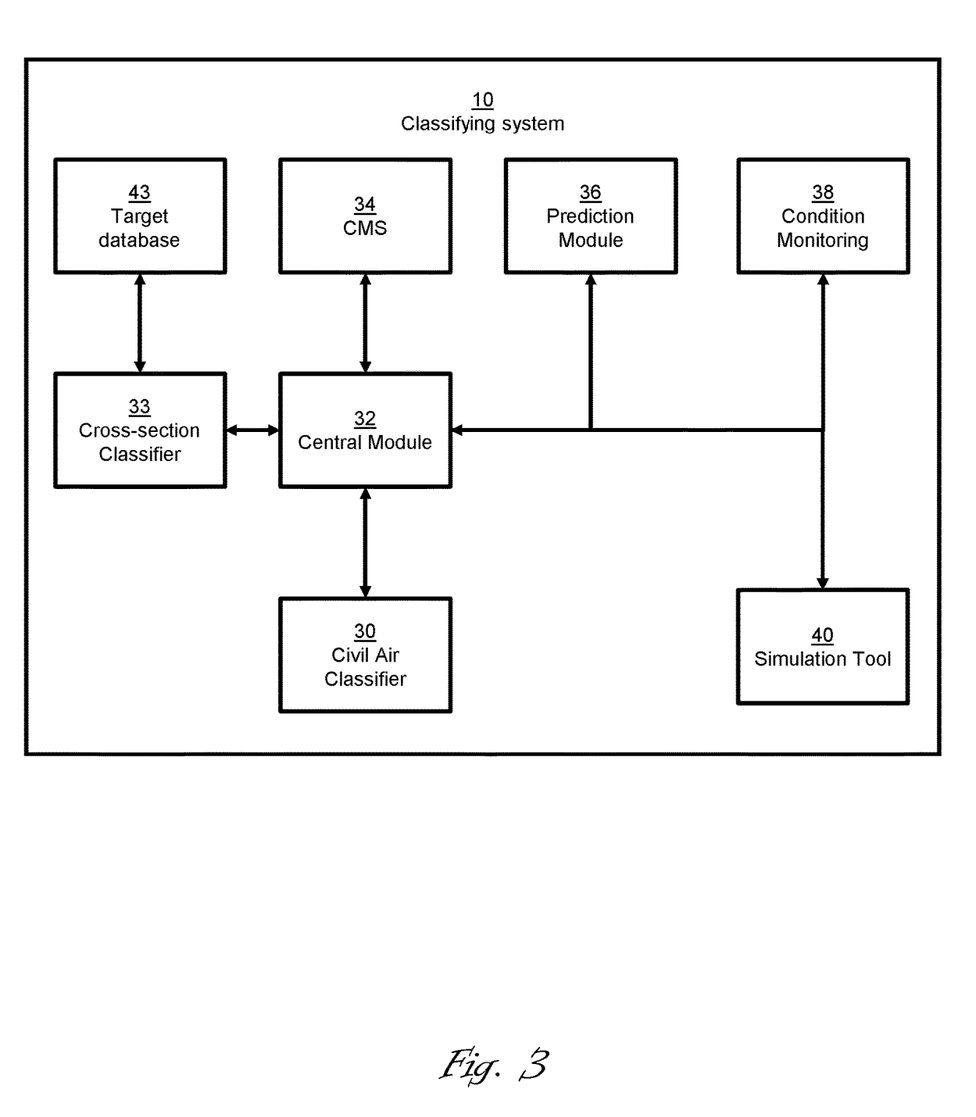

FIG. 3 is a schematic block diagram of the classifying system 10 showing the components which may be used to implement the method shown in FIGS. 2a to 2d. The classifying system may comprise a civil air classifier module 30 which communicates with a central module 32. The central module 32 also communicates with each of a combat management system ("CMS") 34, a prediction module (such as a "ForeSee" software module) 36, a condition monitoring module 38, and a simulation tool module 40. It will be appreciated that the functionality of the various modules could be combined in to fewer modules or separated in to more modules. Similarly, the depicted flow of information and requests for information is merely indicative.

The civil air classifier module 30 may be activated by an API request from the central module 32. As explained in detail above, the civil air classifier module 30 may implement a series of checks, including one or more of a duplicity check, a data pairing check, an air lane check and a current position check or other tests such as testing whether the aircraft is on a probable route. If any of these checks or tests fails, an alert is issued and sent to the central module 32. In addition to issuing an alert, as explained in more detail below, the civil air classifier module 30 may be used to identify the aircraft and this identification is also sent to the central module 32.

The civil air classifier module 30 requires information to be able to identify the aircraft and/or issue an alert. For example, the civil air classifier module 30 may request system track and radar data. In this example, the request is routed through the central module 32. The requested radar data may include positional data in a Cartesian format; i.e. in the form of X, Y, and Z positions and/or radar cross-section of the aircraft. The requested radar data may comprise predicted radar performance data which may be requested from a prediction module 36 (such as a ForeSee module). The requested radar data may also or alternatively comprise actual radar performance data which, in this example, is requested from the condition monitoring module 38. The radar performance data may indicate any maximum range for the radar in terms of its mode and the conditions. The classifier module 30 may itself be located on a moving vessel, e.g. a ship, and there may also be data, e.g. positional data such as latitude, longitude and heading, to capture the information about the vessel. The system track information may be requested from the combat management system (CMS) 34.

The civil air classifier module 30 may send the track of interest to a cross-section classifier module 33, via the central module 32, to compare a cross-section derived from the radar data with a cross-section within a database. The cross-section classifier module 33 requests a stored cross-section value for the same type of aircraft from a target database 43. The target database 43 may be a lookup database comprising cross-sectional values stored against general names for types of aircraft, e.g. jumbo jet, small passenger jet, private jet, military aircraft, or against the specific names for types of aircraft, e.g. Boeing 747. The cross-section classifier module 33 may adjust the received stored cross-section value to calculate an expected cross-section value based on several parameters, e.g. the direction of the illuminating radar, the radar transmitters frequency, the material of the aircraft, the geometry and exterior features of the aircraft. The cross-section classifier may comprise a machine learning algorithm module which would be trained using historical data to build a model to adjust the stored cross-section value to match the physical conditions for the real world measurements. Once the expected value of the cross-section has been calculated, this is compared with the cross-section value from the radar data. A confidence value which is indicative of the likelihood that the two values are matched may then be determined. If there is no match, an alert can be issued.

The civil air classifier module 30 may also be used to create synthetic tracks in conjunction with a simulation tool 40. In this arrangement, the simulation tool 40 activates the creation of the synthetic tracks by issuing an API request to the central module 32, which is routed to the civil air classifier module 30. The synthetic tracks may be created using historic data which has been received by the civil air classifier module 30. The simulation tool may be used to visualise the created synthetic tracks which are representative of the time and region under consideration by a user. For example, the triggering API request may be for track(s) at a particular point in time or over a period in time. The request may specify a single track or a plurality of tracks.

The central module 32 brings all the data from the various modules together to create fused data which is sent to the combat management system (CMS) 34. The alerts are also forwarded from the central module 32 to the combat management system (CMS) 34 (via ALMAS—Alert Management System).

The central module 32 may also comprise an internal performance monitoring module which can be used to log or record every time a classification of a track is made (and also when an alert is issued or a track is classified). A threshold for the correct identification of aircraft tracks can be set at any suitable value between 0 to 100% and a typical confidence threshold may be 90% or 95%. The internal performance monitoring module could also be used to check whether the input or output data is corrupt and warn a user accordingly. The internal performance monitoring module could also be used to check that if the system is shown the same or similar data, the output from the system is the same or similar, i.e. the system assigns the same identity to the same aircraft if the data is repeated. The internal performance monitoring module could also be used to check how quickly the system is identifying tracks. For example, the acceptable threshold for identifying a new track may be set at a few seconds from initial detection. In other words, the speed of identification may be at least as fast as the new tracks are received, subject to there being sufficient computing capability. If a track is not assigned within this system, an alert may be issued for that track or the internal performance monitoring module may flag that the system is not functioning properly.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method for classifying aircraft behaviour, the method comprising:
   receiving aircraft data from an aircraft which is to be classified;
   determining whether the received aircraft data comprises identification information for the aircraft;
   in response to a determination that the received aircraft data comprises identification information, using said identification information to classify the behaviour of the aircraft by
      receiving radar data about the aircraft;
      determining a cross-section value for the aircraft from the radar data;
      comparing the determined cross-section value with an expected cross-section value for the type of aircraft; and
      classifying the behaviour as suspicious in response to determining that the determined cross-section value and the expected cross-section value do not match; and
   in response to a determination that the received aircraft data does not comprise any identification information, obtaining the position of the aircraft, comparing the obtained position to an expected route for the aircraft, and classifying the behaviour of the aircraft based on the comparison.

2. The method of claim 1, comprising:
   obtaining the position of the aircraft which is to be classified;
   comparing the position of the aircraft to known routes to determine whether the aircraft is within any known route; and in response to determining that the aircraft is not on any known route, classifying the behaviour as suspicious.

3. The method of claim 1, comprising:
receiving identification information from a plurality of aircraft at the same time as receiving the aircraft data from the aircraft to be classified; and
wherein using said identification information to classify the behaviour of the aircraft includes determining whether at least part of the identification information duplicates identification information received from one of the plurality of aircraft.

4. The method of claim 1, comprising:
storing historical data for a plurality of aircraft; and
wherein using said identification information to classify the behaviour of the aircraft includes determining whether at least part of the identification information matches identification information in the historical data.

5. The method of claim 4, comprising, in response to determining that at least part of the identification information matches identification information in the historical data:
obtaining a route associated with the matching identification information in the historical data;
obtaining the position of the aircraft;
comparing the obtained position to the associated route to determine whether the aircraft is travelling along the associated route; and
classifying the behaviour as suspicious in response to determining that the aircraft is not travelling along the associated route.

6. The method of claim 5, further comprising, in response to determining that the aircraft is travelling along the associated route:
determining an expected position along the associated route;
comparing the obtained position to the expected position along the associated route; and
classifying the behaviour as suspicious in response to determining that the aircraft is not at the expected position.

7. The method of claim 1, comprising selecting the expected route by comparing the position data for the aircraft to be classified with a plurality of routes which have been generated by a model which has been trained using historical data received from a plurality of aircraft.

8. The method of claim 1, wherein the identification information comprises one or both of (1) an aircraft identification which uniquely identifies the aircraft and (2) a flight identification which identifies a flight path along which the aircraft is travelling.

9. The method of claim 8, comprising:
determining that the identification information comprises both the aircraft identification and the flight identification; and
wherein using said identification information to classify the behaviour of the aircraft includes
comparing the aircraft identification and the flight identification to historical data to determine whether they are a matching pair, and
classifying the behaviour as suspicious in response to determining that the aircraft identification and the flight identification are not a matching pair.

10. The method of claim 1, comprising determining the cross-section value from a signal to noise ratio and observed radar cross-section for the radar data.

11. The method of claim 1, comprising calculating the expected cross-section value using a stored value for the type of aircraft and adjusting based on one or both of (1) a distance to the aircraft and (2) an orientation of the aircraft.

12. A system for classifying aircraft behaviour, the system comprising:
at least one sensor for receiving aircraft data from an aircraft which is to be classified; and
a processor which is configured to
determine whether the received aircraft data comprises identification information for the aircraft,
in response to a determination that the received aircraft data comprises identification information, use said identification information to classify the behaviour of the aircraft by
receiving radar data about the aircraft,
determining a cross-section value for the aircraft from the radar data,
comparing the determined cross-section value with an expected cross-section value for the type of aircraft, and
classifying the behaviour as suspicious in response to determining that the determined cross-section value and the expected cross-section value do not match, and
in response to a determination that the received aircraft data does not comprise any identification information, obtain the position of the aircraft, comparing the obtained position to an expected route for the aircraft, and classifying the behaviour of the aircraft based on the comparison.

13. A non-transitory computer-readable medium encoded with instructions that when executed by one or more processors cause a process to be carried out for classifying aircraft behaviour, the process comprising:
receiving aircraft data from an aircraft which is to be classified;
determining whether the received aircraft data comprises identification information for the aircraft;
in response to a determination that the received aircraft data comprises identification information, using said identification information to classify the behaviour of the aircraft by
receiving radar data about the aircraft;
determining a cross-section value for the aircraft from the radar data;
comparing the determined cross-section value with an expected cross-section value for the type of aircraft; and
classifying the behaviour as suspicious in response to determining that the determined cross-section value and the expected cross-section value do not match; and
in response to a determination that the received aircraft data does not comprise any identification information, obtaining the position of the aircraft, comparing the obtained position to an expected route for the aircraft, and classifying the behaviour of the aircraft based on the comparison.

14. The non-transitory computer-readable medium of claim 13, the process comprising:
one or both of (1) accessing historical data for a plurality of aircraft and (2) receiving identification information from a plurality of aircraft contemporaneously with receiving the aircraft data from the aircraft to be classified; and
wherein using said identification information to classify the behaviour of the aircraft includes determining whether at least part of the identification information matches one or both of (1) identification information in the historical data and (2) identification information received from one of the plurality of aircraft.

15. The non-transitory computer-readable medium of claim 13, wherein the identification information comprises one or both of (1) an aircraft identification which uniquely identifies the aircraft and (2) a flight identification which identifies a flight path along which the aircraft is travelling.

16. The non-transitory computer-readable medium of claim 13, the process comprising:
    determining that the identification information comprises both the aircraft identification and the flight identification; and
    wherein using said identification information to classify the behaviour of the aircraft includes
        comparing the aircraft identification and the flight identification to historical data to determine whether they are a matching pair, and
        classifying the behaviour as suspicious in response to determining that the aircraft identification and the flight identification are not a matching pair.

17. The non-transitory computer-readable medium of claim 13, the process comprising determining the cross-section value from a signal to noise ratio and observed radar cross-section for the radar data.

18. The non-transitory computer-readable medium of claim 13, the process comprising calculating the expected cross-section value using a stored value for the type of aircraft and adjusting based on one or both of (1) a distance to the aircraft and (2) an orientation of the aircraft.

* * * * *